(12) United States Patent
Musselman

(10) Patent No.: US 7,497,447 B2
(45) Date of Patent: Mar. 3, 2009

(54) SNOWMOBILE SKI AND METHOD

(75) Inventor: Robert S Musselman, Hope, MI (US)

(73) Assignee: International Engineering & Manufacturing, Inc., Hope, MI (US)

( * ) Notice: Subject to any disclaimer, the term of this patent is extended or adjusted under 35 U.S.C. 154(b) by 0 days.

(21) Appl. No.: 11/546,745

(22) Filed: Oct. 13, 2006

(65) Prior Publication Data

US 2007/0029744 A1 Feb. 8, 2007

Related U.S. Application Data

(62) Division of application No. 10/857,523, filed on Jun. 1, 2004, now Pat. No. 7,185,897.

(51) Int. Cl.
- *B62B 9/04* (2006.01)
- *B62B 13/00* (2006.01)
- *B62B 15/00* (2006.01)
- *B62M 27/00* (2006.01)
- *B62M 29/00* (2006.01)
- *A63C 5/00* (2006.01)
- *A63C 5/06* (2006.01)
- *A63C 5/04* (2006.01)
- *B62D 55/00* (2006.01)

(52) U.S. Cl. .................. 280/28; 280/601; 280/606; 280/608; 280/11.18; 280/28.14; 180/9

(58) Field of Classification Search .................. 280/28, 280/601, 606, 608, 11.18, 28.14; 180/9
See application file for complete search history.

(56) References Cited

U.S. PATENT DOCUMENTS

| | | | |
|---|---|---|---|
| 3,605,926 A | 9/1971 | Leonawicz | |
| 3,632,126 A * | 1/1972 | Shorrock | .................. 280/28 |
| 3,732,939 A | 5/1973 | Samson | |
| 3,739,458 A | 6/1973 | Reedy | |
| 3,751,057 A | 8/1973 | Matthiessen | |
| 3,778,074 A | 12/1973 | Kozlow | |
| 3,850,440 A * | 11/1974 | Reedy et al. | .................. 280/28 |
| 3,857,578 A | 12/1974 | Alton | |
| 3,942,812 A | 3/1976 | Kozlow | |
| 4,364,447 A | 12/1982 | Yoshida | |
| 4,500,766 A | 2/1985 | Reinhardt | |
| 5,344,168 A | 9/1994 | Olson et al. | |
| 5,599,030 A | 2/1997 | Campbell et al. | |
| 6,331,008 B2 | 12/2001 | Cormican | |
| 6,354,391 B1 | 3/2002 | Cormican | |
| 6,364,321 B1 * | 4/2002 | Steinhauser, Jr. | ......... 280/11.18 |
| 6,378,889 B1 | 4/2002 | Moriyama et al. | |
| 6,419,241 B1 * | 7/2002 | Chenevert | ................ 280/11.18 |

(Continued)

*Primary Examiner*—Christopher P Ellis
*Assistant Examiner*—John R Olszewski
(74) *Attorney, Agent, or Firm*—Robert L. McKellar; McKellar IP Law, PLLC

(57) ABSTRACT

A snowmobile ski including a runner fabricated from flat metal plate stock and incorporating mounting features for securing the runner to the ski and a wear strip of a relatively harder material provided on and projecting from a lower surface of the runner body. A quick release mounting system is provided for attaching the runner to the ski, including quick installation and release wedge mounting systems. The thin runner blade and wear strip are of the same thickness and are joined by a brazed joint. The invention contemplates a method of fabricating the runner and a method of mounting the runner.

14 Claims, 7 Drawing Sheets

U.S. PATENT DOCUMENTS

| | | | |
|---|---|---|---|
| 6,481,724 B1 * | 11/2002 | Whipp | 280/7.13 |
| 6,513,612 B2 | 2/2003 | Moriyama et al. | |
| 6,619,676 B2 | 9/2003 | Cormican | |
| 6,626,444 B2 | 9/2003 | Noble | |
| 6,631,912 B2 | 10/2003 | Metheny | |
| 6,971,653 B2 | 12/2005 | Takahiko | |
| 6,974,139 B2 * | 12/2005 | Lund | 280/28 |
| 7,185,897 B2 * | 3/2007 | Musselman | 280/28 |
| 7,243,924 B2 * | 7/2007 | Dahlo et al. | 280/11.18 |
| 2001/0013687 A1 | 8/2001 | Cormican | |
| 2001/0022435 A1 | 9/2001 | Cormican | |
| 2002/0079659 A1 | 6/2002 | Cormican | |
| 2003/0034619 A1 | 2/2003 | Bergstrom | |
| 2003/0151216 A1 * | 8/2003 | Takahiko | 280/28 |
| 2004/0061296 A1 * | 4/2004 | Metheny | 280/28 |
| 2005/0017465 A1 | 1/2005 | Bergstrom | |

* cited by examiner

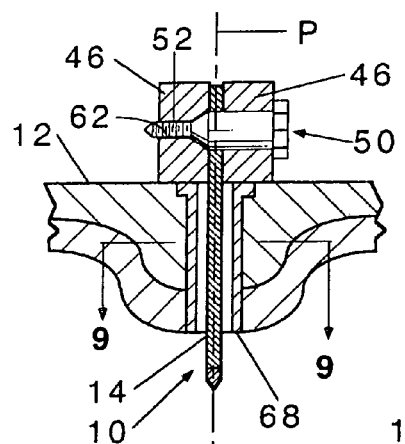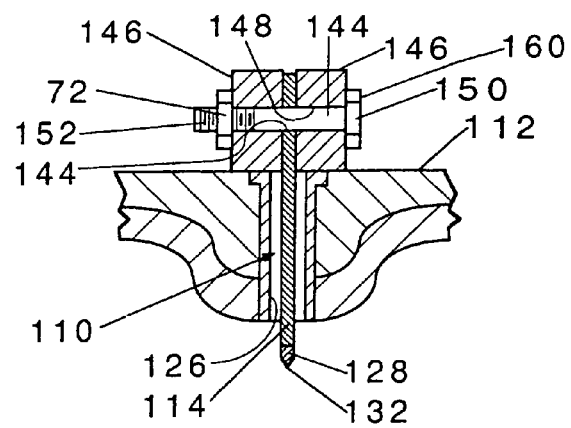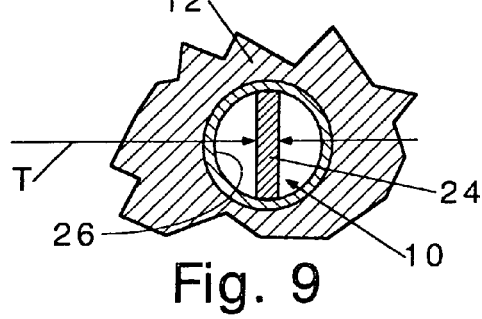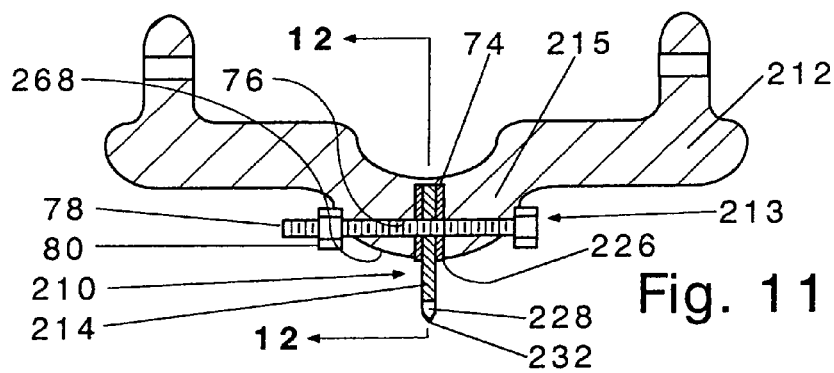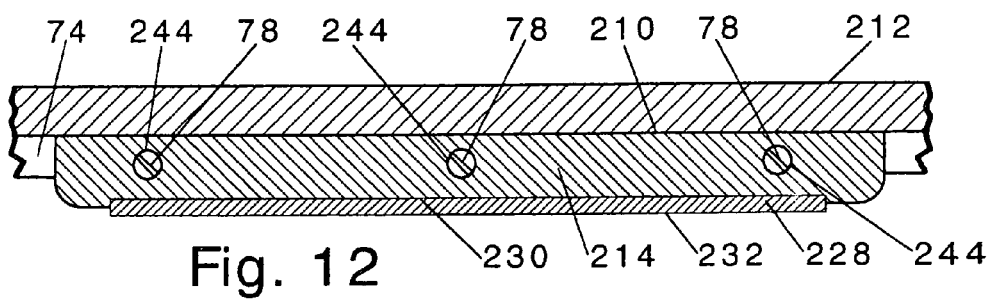
Fig. 8
Fig. 10
Fig. 9
Fig. 11
Fig. 12

SNOWMOBILE SKI AND METHOD

This is a division of copending application Ser. No. 10/857,523 filed in the U.S. Patent and Trademark Office on Jun. 1, 2004, which is incorporated herein by reference.

BACKGROUND OF THE INVENTION

1. Technical Field

This invention relates generally to replaceable runners for snowmobile skis, and method of making same more particularly to the mounting of such runners on the ski.

2. Related Art

FIG. 1 is a cross sectional end view of a conventional snow ski outfitted with a typical wear bar or runner that is used to enhance the traction of the snow ski, particularly on icy terrain. The conventional runner includes an elongated runner body fabricated of cast steel rod that extends between opposite ends. A pair of threaded studs are welded to the top surface of the runner body and extend through associated openings in the ski. Nuts are threaded onto the exposed upper ends of the threaded studs and are tightened to draw the upper surface of the runner body tightly against the underside of the ski to secure the runner rigidly, but removably, in place. A slot is cut in a lower surface of the runner body and a carbide wear strip is brazed therein. The carbide wear strip presents an exposed lower running surface for engaging a terrain and enhancing the traction and thus steerability of the skis, particularly on icy or packed snow conditions. While such runners are effective at enhancing the steerability of the skis, they are rather bulky and take time to replace, particularly if the threads of the mounting studs become corroded, making removal of the nut difficult. Moreover, the runners are prone to loosening due to constant vibration and stress placed on the mounting system causing the nuts to unthread over time.

It is an object of the present invention to improve upon runner systems for snowmobile skis and to simplify the construction and mounting of such runner systems.

SUMMARY OF THE INVENTION AND ADVANTAGES

A runner constructed according to one aspect in the invention is mountable on a ski of an ice-going vehicle and comprises an elongate runner body fabricated of a first material having longitudinally opposite ends, an upper surface and a lower surface. At least two mounting members extend from the upper surface of the runner body. A wear strip, fabricated of a second material relatively harder than that of the first material, projects from the lower surface of the runner body and presents an exposed ice-engaging runner body surface. According to the invention, the runner body and the at least two mounting members are fabricated of a single piece of flat metal plate of the first material.

The invention has the advantage of providing a runner in which the runner body and mounting members are fabricated of the same material and further which have a flat plate construction, thereby minimizing the weight of the overall runner and simplifying the construction of the runner. Unlike the prior art runners in which the mounting members are separately fabricated from the runner body and then joined by a separate brazing or welding operation in the typical form of a threaded cylindrical stud, the present invention has the advantage of incorporating the manufacture of the mounting members in with the manufacture of the runner body, thereby simplifying the construction and manufacture of the runner.

According to a further aspect of the invention, an improved mounting system is provided for readily mounting and unmounting the runner to and from a snow ski. In particular, the mounting members are formed with a wedge-engaging surface which is preferably arranged transverse to the longitudinal direction of the mounting members. The wedging surfaces are operative to interact with a wedge connection that acts between the wedging surface and the snow ski to forceably draw the mounting members through associated openings in the ski, bringing an upper surface of the runner body tightly against an underside of the snow ski. This wedging approach to mounting the runner body is to be used in place of the traditional threaded stud and nut-type mounting system of conventional runners and is less prone to loosening when subjected to stress and vibration during use. In addition, the wedge-type mounting system provides a convenient quick-release feature to the runner, enabling a user to quickly and conveniently mount and dismount the runner which is advantageous, particularly in competitive snowmobile racing conditions where time is crucial.

According to another aspect in the invention, a snowmobile ski assembly is provided having a longitudinally extending ski with an upper and lower surface and at least two longitudinally spaced runner openings extending between the surfaces. A runner is provided having a runner body extending longitudinally between opposite ends and having an upper surface and a lower surface. At least two mounting members extend from the upper surface of the runner body and are spaced longitudinally from one another at a distance to enable the mounting members to be extended through the runner openings from the lower surface of the ski. A hard wear strip which may comprise carbide, projects from a lower surface of the runner and provides an ice-engaging running surface to enhance traction. According to the invention, the mounting members comprise flat portions which are simple to make and weigh less than the traditional threaded stud mounting members of prior art runners. The flat portion mounting members further are readily adaptable to the wedge lock mounting system described above and thus shares the same advantages.

According to a further aspect of the invention, a method of fabricating a runner of the type described is provided and includes the stamping of the runner body from a thin flat plate of metal with mounting features which facilitate quick coupling and decoupling to and from the underside of a snowmobile ski. In one configuration, the mounting features are formed by concurrently stamping transverse wedge openings in the runner body. In another configuration, the mounting features are formed by concurrently stamping mounting members which are integral with the upper surface of the runner body. The method contemplates the concurrent stamping of wedging surfaces that comprise wedge holes or notches extending through the mounting members.

BRIEF DESCRIPTION OF THE DRAWINGS

These and other features and advantages of the present invention will become more readily appreciated when considered in connection with the following detailed description and appended drawings, wherein:

FIG. 8 is fragmentary cross-sectional end view, similar to FIGS. 6 and 7, illustrating a final installation step;

FIG. 9 is a greatly enlarged top cross-sectional view, taken along the line 9-9 of FIG. 8;

FIG. 10 is a front end cross-sectional view of a snow ski and runner constructed according to a second embodiment of the invention;

FIG. 11 is a front end cross-sectional view of a snow ski and runner assembly constructed according to a third embodiment of the invention;

FIG. 12 is a cross-sectional side view taken generally along section line 12-12 of FIG. 11;

DETAILED DESCRIPTION OF THE PREFERRED EMBODIMENT

Figure 2:
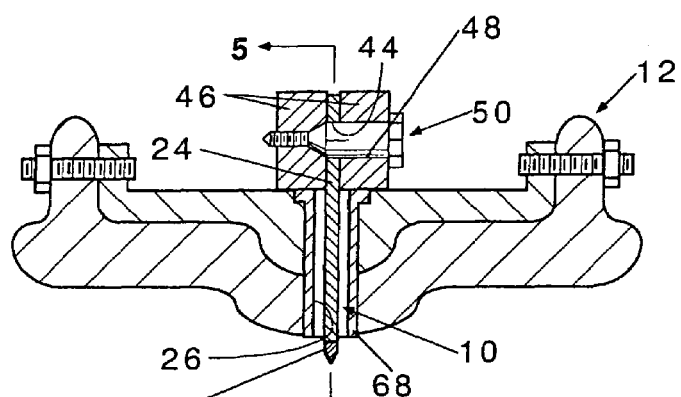
FIG. 2 is a front end cross-sectional view of a snowmobile ski and runner assembly constructed according to a first embodiment of the present invention.
Figure 3:
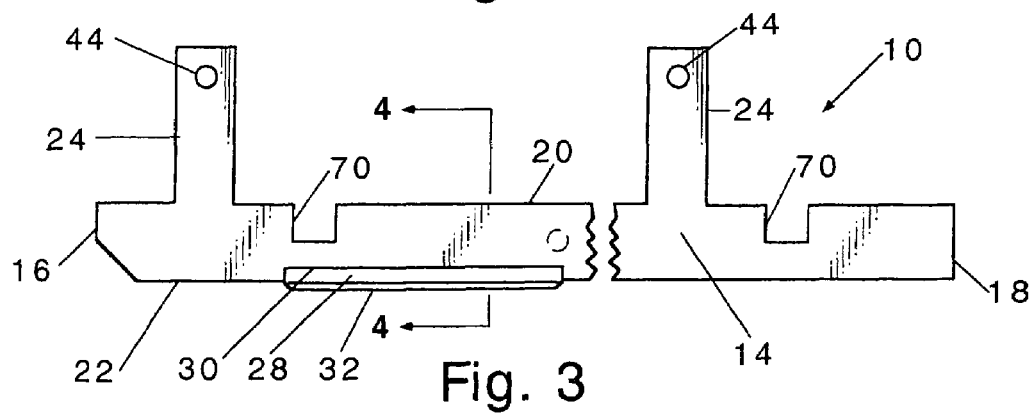
FIG. 3 is a side elevation view of a runner constructed according to a first embodiment to the invention and mounted in the assembly illustrated in FIG. 2.
Figure 4:
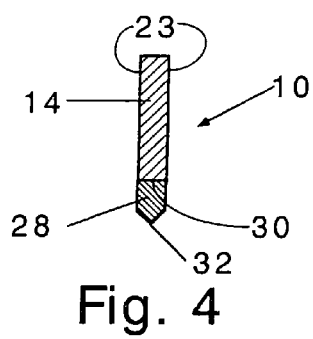
FIG. 4 is an enlarged rear cross-sectional view taken along the section line 4-4 of FIG. 3.

A traction increasing wear bar or runner constructed according to a first presently preferred embodiment of the invention, as indicated generally at 10 in FIGS. 3 and 4, shown mounted on a snowmobile ski 12 in FIGS. 2 and 5-9. The ski 12 includes a ski runner 11, which may be fabricated from plastic material, having a vertically depressed, centrally disposed, elongate keel 13 provided with opposed side walls 15.

Figure 1:
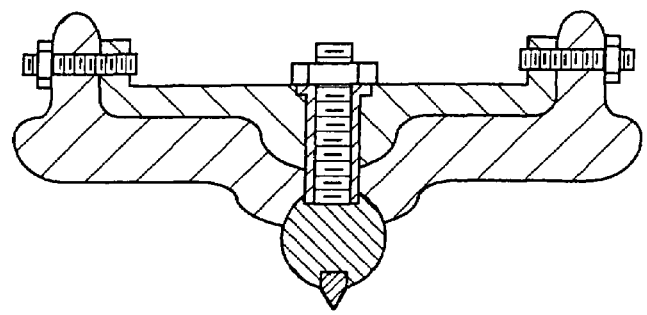
FIG. 1 is a front end cross-sectional view representative of a prior art snowmobile ski and runner assembly.
Figure 5:
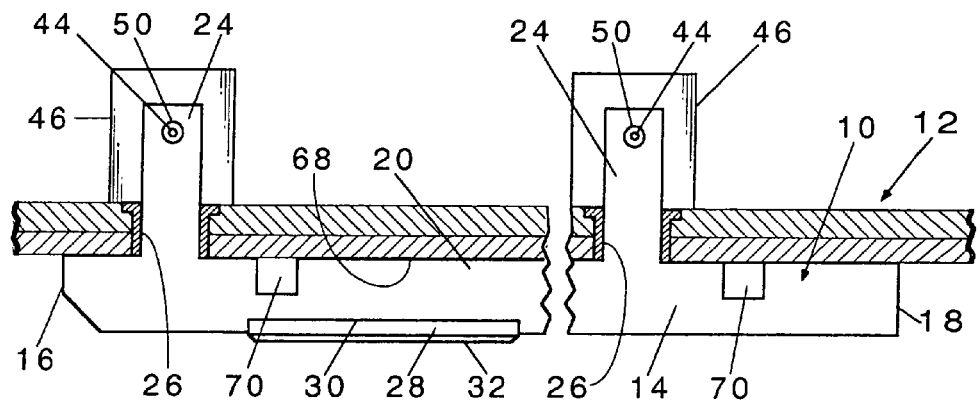
FIG. 5 is a side cross-sectional view taken generally along the section line 5-5 of FIG. 2.
Figure 6:
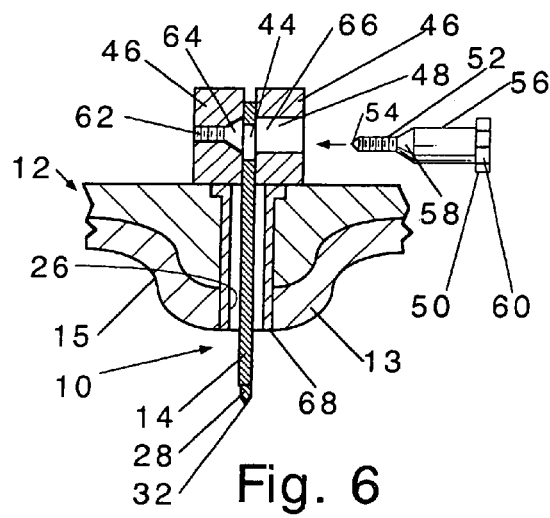
FIGS. 6-7 are greatly enlarged fragmentary cross-sectional end views, similar to FIG. 2, but illustrating the steps involved in installing the runner in position on the ski.

The runner 10 includes a runner body 14 which is fabricated as a single piece, stamped, die cut or otherwise totally concurrently cut from a flat sheet or plate of metal stock of a first material, such as steel or aluminum-based metals. The runner body 14 extends longitudinally between opposite ends 16, 18 and has an upper surface 20, a lower surface 22 and opposed lateral side surfaces 23 extending therebetween. The runner 10 includes mounting features associated with the runner body 14 which are concurrently stamped and operate to mount the runner 10 to the ski 12 in a manner to be described in greater detail below. According to the first embodiment, the mounting features are in the preferred form of at least a pair of mounting members 24 projecting from and integral with the upper surface 20 of the runner body 14. (FIG. 3). The mounting members 24 are preferably fabricated of the same sheet stock material as that used to form the runner body 14 and are preferably concurrently stamped or die cut at one time and as one piece with the runner body such that the mounting features are incorporated into the one piece construction of the runner body 14. The mounting members 24 thus have a flat plate construction and extend transverse to the longitudinal axis of the runner body 14. The mounting members 24 are spaced longitudinally from one another by a distance corresponding to an associated set of longitudinally spaced ski runner openings 26, formed in the ski 12, as illustrated best in FIG. 5. The ski runner openings 26 may have a slot-shaped configuration corresponding generally to the cross-sectional size and shape of the mounting members 24 or, as illustrated in FIGS. 2 and 5-9, with particular emphases on FIGS. 5 and 9, the runner openings 26 may have a generally cylindrical shape with the width of the mounting members 24 being sized to engage or be spaced slightly from the walls of the runner openings 26 as shown in FIGS. 5 and 9 such that the walls of the runner openings provide both for and aft and side to side support to the mounting members despite being circular in cross-section rather than rectangular. As such, the flat plate mounting member feature can be readily adapted as a retrofit to existing snowmobile skis 12 fitted with cylindrical runner openings 26 that previously would have been used to receive cylindrical threaded mounting studs of prior art runners, such as that shown representatively in FIG. 1 described in the background. The mounting members 24 are preferably free of screw thread features.

A wear strip 28 is joined to the lower surface 22 of the runner body 14. The wear strip 28 is fabricated of a second material, such as a carbide material, which is relatively harder and thus more wear resistant than that of the first material of the runner body 14. For example, the wear strip 28 can be fabricated of a hard carbide material, whereas the runner body 14 can be fabricated of an aluminum-based material of lesser hardness. The runner body 14 is preferably formed with a wear strip notch 30 that is recessed in the lower surface and which is spaced from the ends 16, 18 but extends fully across the entire width of the runner body 14 so as to be open to the opposing side surfaces 23 of the runner body. The wear strip 28 preferably has a width or thickness corresponding to that of the runner body 14 and a length corresponding to that of the notch 30. The height of the wear strip 28 exceeds the depth of the notch 30 such that the wear strip 28 projects downwardly from the lower surface 22 of the runner body 14 to present an exposed ice-engaging runner surface for engaging the terrain on which the ski 12 runs, such as on ice or snow-packed conditions. As illustrated in FIGS. 2, 8 and 10 the runner body 14, mounting members 24, and wear strip 28 lie in the same vertical plane P. As illustrated in FIG. 9, the transverse thickness T of the runner body 14 and mounting members 24 is uniform and substantially equal throughout.

Figure 16:
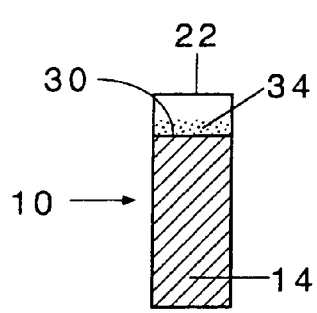
Figure 17:
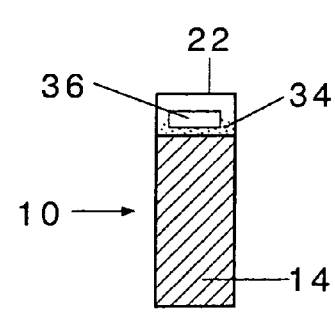
Figure 18:
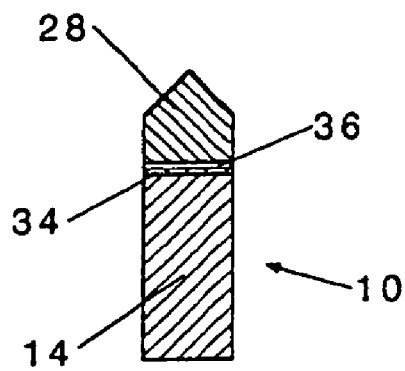
Figure 19:
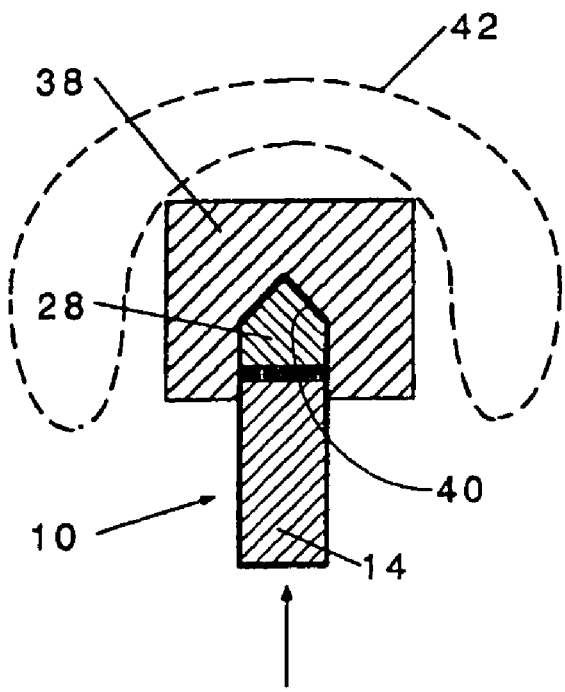

With reference to FIGS. 15-19, a process is provided for joining the wear strip 28 to the runner body 14. As mentioned, the invention contemplates using an aluminum-based material for the runner body which presents challenges since aluminum is prone to forming a very tough, stable oxide on its surface which is resistant to forming a metallurgical bond with another material at the interface as the oxide serves as a barrier to the intermixing of metals. The invention provides one technique for addressing and overcoming the challenges of joining the wear strip 28 to an aluminum runner body 14, which could equally be used when materials other than aluminum are used for the runner body, such as steel. As shown in FIGS. 15-18, the method involves inverting the runner 10 such that the lower surface 22 of the runner body 14 is facing upwardly. When so positioned, a flux agent 34 is introduced to the notch 30 (FIG. 16). The flux agent 34 is one chosen to interact favorable during joining to break up any oxides or other impurities or impediments to promote the formation of a metallic bond at the interface of the materials to be joined. In the preferred method, a strip 36 of brazing material is laid in the notch 30 overtop the fluxing agent 34, as illustrated in FIG. 17. The wear strip 28 is then placed in the notch 30 atop of the strip of braze material 36, as shown in FIG. 18, and the pre-joined assembly of components is supported by relatively positioning the components and a guide 38 so that the guide 38 is at least partially around the components to hold them in position during joining. The guide 38 is shown in FIG. 19 and preferably comprises a block of electrically non-conductive material, such as a ceramic material. The guide 38 is formed with a downwardly opening recess 40 that compliments the shape of the assembled components such that the walls of the recess engage and support the wear strip 28 in alignment with the runner body 14 during joining. Brazing is carried out preferably by induction heating. As shown schematically in FIG. 19, the assembled wear strip 28, runner body 14 and guide 38 are placed in the presence of an induction heating field 42 which passes through the guide 38 and reacts at the interface to heat the runner body 14, flux agent 34, braze material 36 and wear strip 28 but without heating the guide 38. On heating, the flux agent 34 reacts with the runner body 14 to break up any oxides on its surface simultaneously or near simultaneously with the melting of the brazed material 36 which then interacts with the surfaces of the runner body 14 and wear strip 28 to form, upon cooling, a metallic braze joint therebetween. When brazing of the strip 28 to the runner body 14 is completed, the entire assembly may be deposited into a quenching liquid such as oil to thru harden the runner body 14 to increased hardness (if the runner body 14 is steel) which is still less than the hardness of the carbide wear strip 28. The quenching liquid preferably has a quenching rate of reducing the temperature of the product 600° F. per minute. Other quenching mediums include molten salt baths, polymers, etc.

Turning back to FIGS. 2 through 9, the means for mounting the runner 10 on the ski 12 according to the invention will now be described in connection with the first embodiment. As illustrated in FIGS. 3 and 5, the mounting members 24 are formed with wedge-engaging surfaces 44, in the preferred form of mounting holes, provided adjacent the free ends of the mounting members 24. To mount the runner 10 on the ski 12, the free ends of the mounting members 24 are extended into the ski runner openings 26 from the lower surface 68 of the ski 12. The ski 12 is preferably formed to include a pair of laterally spaced mounting blocks 46 mounted atop the ski 12 and defining an opening communicating with the runner openings 26 in position to receive the upper free ends of the mounting members 24 as they are extended through the ski runner openings 26. The lateral spacing between the adjacent mounting blocks is sufficient to accommodate the introduction of the mounting members 24 and can be either a snug or loose fit with respect to the lateral thickness or width of the mounting members, but is preferably slightly greater in spacing than the thickness of the mounting members 24. As shown best in FIG. 6, the mounting blocks 46 are formed with a cross-bore 48 for receiving a fastener 50 as described below. The fastener or coupling bolt 50 has a reduced diameter threaded end 52 with a conical shaped terminal end 54. The threaded end section 52 transitions to an enlarged diameter unthreaded shank section 56 via an intermediate frustoconical shaped camming surface or ramp 58. A bolt head 60 is secured to the free end of the shank 56. The cross-bore 48 of the mounting blocks 46 has a shape complimenting that of the fastener 50 and includes a threaded section 62 and an adjoining frustoconical camming surface 64 provided on one half of the mounting blocks 46, and an enlarged shank bore 66 provided on the other of the mounting blocks. If the mounting blocks 46 are formed of yieldable plastic material, the threaded sections 62 may comprises an internally threaded metal fastener, such as a T-nut.

Figure 7:
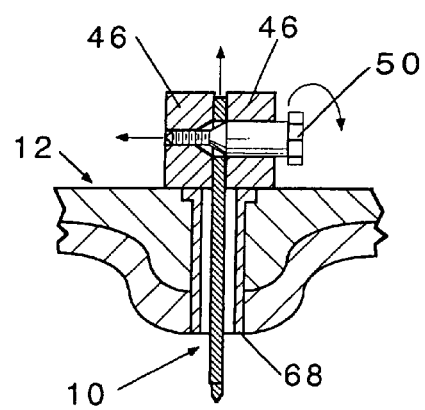

The mounting hole 44 of the mounting members 24 is positioned along the mounting members 24, such that when a user inserts the mounting members 24 the runner body 14 by hand into the runner openings 26 and extends the runner body 14 to the point where its upper surface 20 closely approaches a lower surface 68 of the ski 12, there is a slight misalignment between the holes 44 and the mounting members 24 and the cross-bore 48 in the mounting blocks, such that the axis of the mounting holes 44 is slightly below the axis of the cross-bore 48. According to the invention, there is a wedging action which occurs between the fastener 50, the cross-bore 48 and the mounting holes 44 which acts to bring the axis of the holes into alignment and to urge the runner body 14 further upwardly into tight, stable engagement with the underside 68 of the ski to hold the runner firmly in place during operation. As the upper surface 20 engages the underside of the ski runner keel 13, any undulations on the underside of the plastic material in the ski runner keel may slightly yield and compress under the force of the wedging action to facilitate the final upward positioning of the runner body 12, with a preload, in tight clamping relation with the ski keel 13. As illustrated in FIG. 7, the threaded section 62 of the fasteners 50 are guided through the shank bores 66, mounting holes 44 and camming surface 64 into the threaded section 62, whereupon turning the fasteners 50 to tighten it brings the camming surface 58 of the fasteners 50 into engagement with the upper edge of the mounting holes 44 of the runner body 14. Further advancement of the fasteners 50 causes the mounting members 24, and thus the runner body 14, to cam upwardly across the camming surface 64, whereupon the upper surface 20 of the runner body 14 is urged more and more into tight engagement with the lower surface 68 of the ski, until such point as the fastener 50 is advanced to where the unthreaded shank section 56 enters the mounting hole 44, as illustrated in FIGS. 2, 5 and 8. In this manner, the runner 10 is firmly locked to the ski 12, but yet is readily removable for replacement by simply unthreading the fastener 50 and inserting a pry tool, such as a screwdriver (not shown) in one of both notches 70 and to apply a downward prying force to withdraw the mounting members 24 from the runner openings 26.

Alternate Embodiment

FIG. 10 illustrates an alternative embodiment of the invention wherein the same reference numerals are used to represent the same or like features, but are offset by 100. The runner 110 is constructed identically to that of the runner 10 of the first embodiment. The mounting blocks 146 differ in that the cross-bores 148 are simply a straight bore of uniform diameter corresponding closely to that of the diameter of the mounting holes 144 of the runner 110. A simple fastener 150 with a bolt head 160 and threaded end section 152 is passed through the cross-bore 148 and mounting hole 144 without any wedging action and is secured by a nut 72.

Third Alternate Embodiment

FIGS. 11 and 12 illustrate a snowmobile ski and runner assembly constructed according to a third embodiment of the invention, wherein the same reference numerals are used to indicate the same or like features as that of the first embodiment, but are offset by 200. In this embodiment, the runner body 214 lacks the projecting mounting members 24 employed in the first embodiment, and instead provides at least two and preferably at least three mounting holes 244 formed in the runner body 214 at locations between the ends 216, 218 and between the upper and lower surfaces 220, 222. The wear strip 228 is formed and joined to the underside of runner body 214 in the same manner as that described in connection with the first embodiment. The ski 212 has its runner opening 226 (FIG. 11) provided in the keel 213 in the form of an elongated vertical channel or slot 74 which is opened to the lower surface 268 of the ski 212, but is closed at least in part to the upper surface thereof such that the runner 210 does not extend above the upper surface of the ski 212. The keel 213 is formed with a plurality of cross-bores 76 which intersect the slot 74 in alignment with the mounting holes 244 of the runner body 214. A fastener 78 is introduced into each cross-bore 76 and extends through the mounting holes 244 and is secured by an associated nut 80 for securing the runner 210 to the ski 212. The invention contemplates that the cross-bore 76 can be configured to correspond to that of the cross-bore 48 of the first embodiment and the fastener 78 configured to correspond to that of the fastener 50 to provide wedging engagement of the runner 210 within the slot 74 of the ski 212 wherein an upper surface of the runner 210 would be urged under the camming action firmly against the upper base wall of the slot 74. Depending on the thickness of the walls of the keel 213, the squeezing force exerted by the relative turning of the bolt 78 and the nut 80, the keel walls 215 can be compressed against opposite sides of the runner body 214.

Fourth Alternate Embodiment

Figure 13:
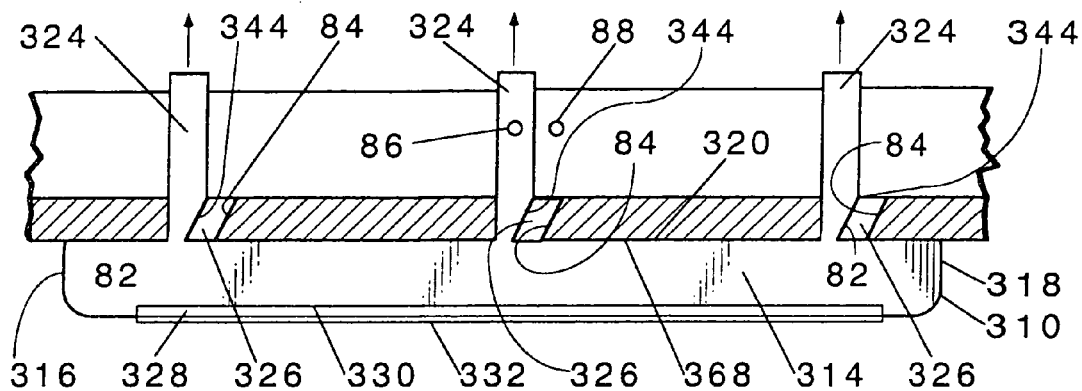
FIGS. 13-14 are fragmentary sectional side views of a snow ski and runner assembly, constructed according to a fourth embodiment of the invention, illustrating sequential steps of installation.
Figure 14:
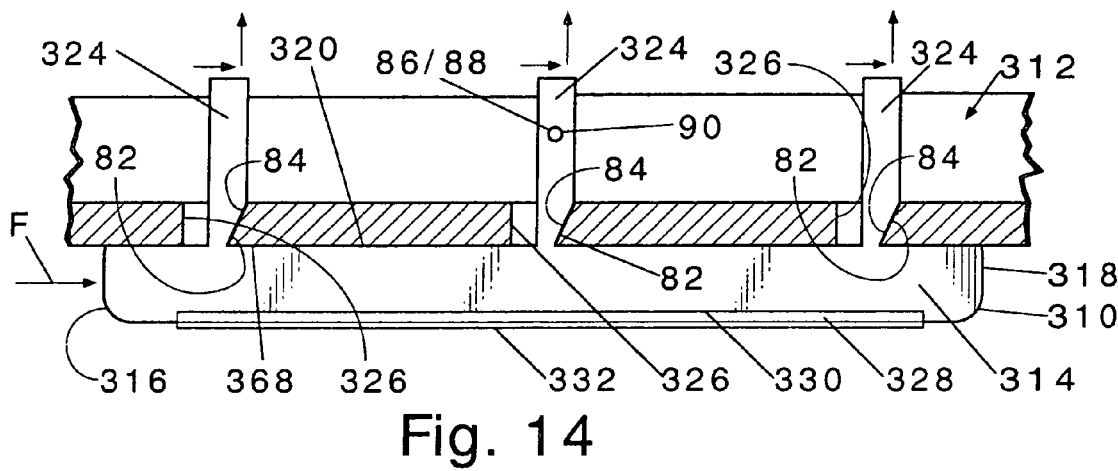
Figure 15:
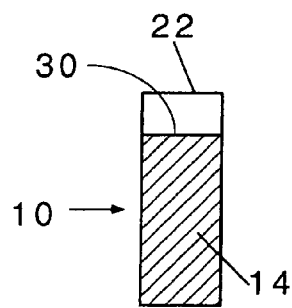
FIGS. 15-19 are enlarged front cross-sectional end views taken through carbide receiving slot of the runner body illustrated in FIG. 3, illustrating successive steps in the manufacture of a runner according to the invention.

FIGS. 13 and 14 illustrate yet a fourth embodiment of the invention, wherein the same reference numerals are used to indicate the same or like features, but are offset by 300. The runner 310 has a runner body 314 and mounting members 324 projecting from an upper surface 320 of the runner body 314. The wedge-engaging surface 334 is in the form of a camming notch 82 formed in at least one and preferably all of the mounting members 324, as illustrated best in FIG. 13. The camming notches 82 are preferably formed at the base of the mounting members 324 and taper inwardly to a point deepest at the base. The ski 312 is formed with runner openings 326 associated with the mounting members 324. The runner openings 326 are oversized in relation to the width of the mounting members 24 one edge of each runner opening 326 is formed with a camming surface 84. The mounting members 324 are initially introduced through the runner openings 326 with the camming notch 82 spaced longitudinally from the camming surfaces 84, as illustrated in FIG. 13. The runner body 314 is then forceably slid longitudinally relative to the ski 312 by application of a force F applied to the runner 310 such as by a sharp blow from a hammer, to forceably urge the camming notches 82 into camming engagement with the camming surfaces 84 of the openings to drive the runner 310 further upwardly, bringing the upper surface 320 of the runner body 314 tightly against the lower surface 368 of the ski 312.

As shown in FIG. 13, at least one of the mounting members 324 is formed with a retaining hole 86 which is initially misaligned with a corresponding retaining hole 88 formed in the ski. However, when the runner 310 is forced to the tightly wedged installed position of FIG. 14, the holes 86, 88 align, enabling a pin 90 to be installed therein to retain the runner 310 in position on the ski 312 against inadvertent loosening. To remove the runner 310, the user simply pulls the pin 90 and then strikes the runner 310 with a hammer in the opposite direction to drive the camming notches 82 out of engagement with the camming surface 84 as in FIG. 13, allowing the runner 310 to be disassembled from the ski 312 and replaced.

Fifth Alternate Embodiment

Figure 20:
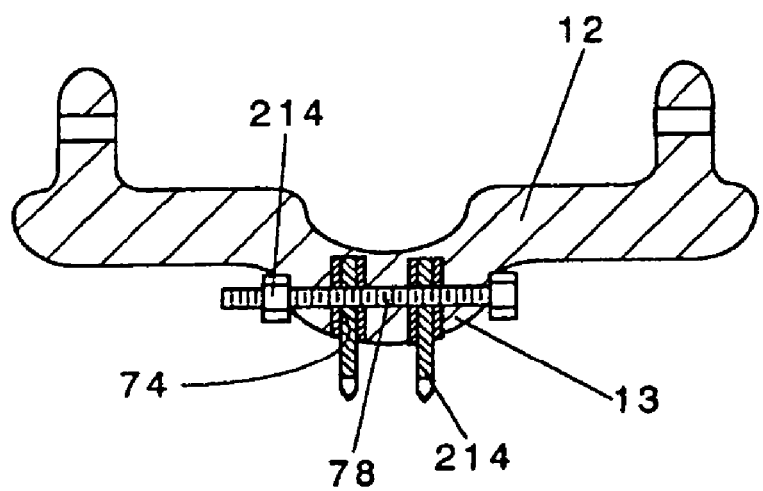
FIG. 20 is a front end cross-sectional view of a snowmobile ski and runner assembly constructed according to a fifth embodiment of the invention.
Figure 21:
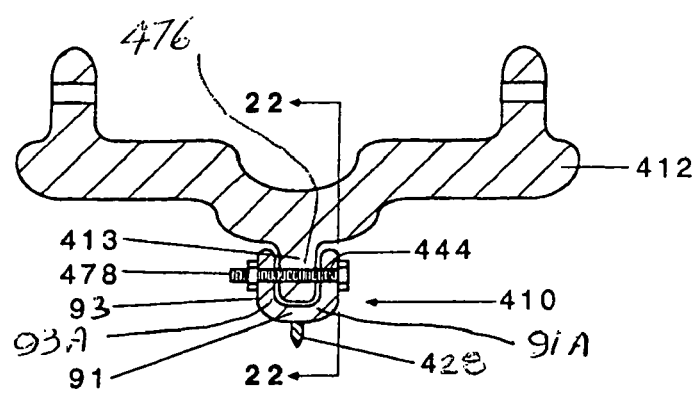
FIG. 21 is a front end cross-sectional view of a snow ski and runner assembly constructed according to a sixth embodiment of the present invention.

FIG. 20 illustrates a further embodiment of the invention which, essentially is like the embodiment of FIGS. 11 and 12, except that instead of just a single runner 214, there is provided a plurality of such laterally spaced longitudinally extending runners 214, with two being shown. The keel 213 of the ski is formed with a corresponding plurality of laterally spaced apart, longitudinally extending grooves, channels or slots 74 in which the runners 214 are received. The fasteners 78 extend through the aligned openings 244 in the runners 214 and pass transversely through the slots 74 for securing the runners 214 releasably on the ski. The runners 214 are preferably identically constructed and thus interchangeable. The runners 214 are preferably discrete, separate structures that, when mounted, are spaced laterally from one another. If desired, the runner 214 may be of different lengths and/or may be longitudinally staggered.

Sixth Alternate Embodiment

FIGS. 21-22 and 27-29 illustrate yet a sixth embodiment of the invention wherein the same reference numerals are used to indicate the same or like features but are offset by 400. The ski 412 and the keel 413 differ from the ski 12 and keel 13 in that the ski 412 and the keel are more flexible throughout their lengths to more closely follow any undulations in the underlying terrain being traversed. The ski 412 may be much thinner than the ski 12 and the keel 413 is much narrower than the keel 13 and does not include a downwardly opening slot therein or vertically extending therethrough.

Figure 22:
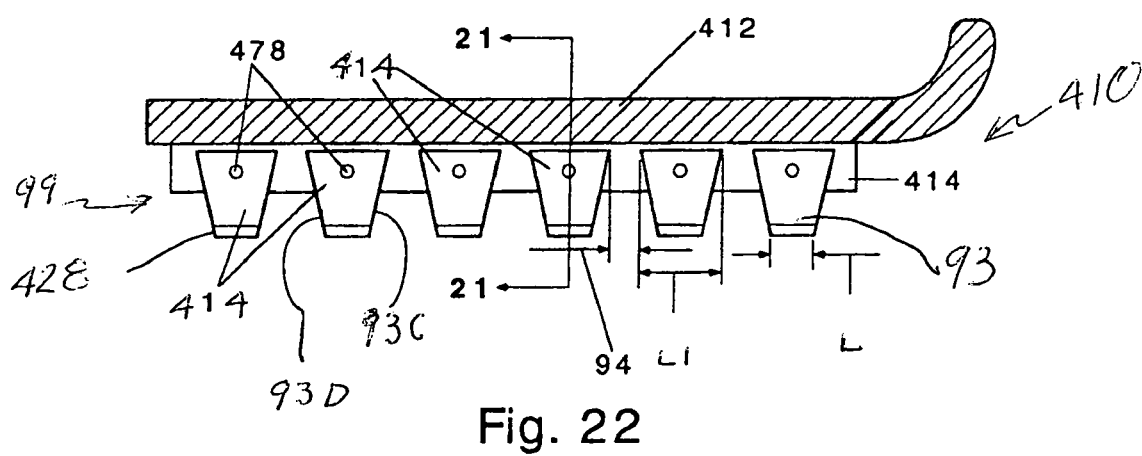
FIG. 22 is a greatly enlarged sectional side view, taken along the line 22-22 of FIG. 21.

As illustrated in FIG. 22, the runner 410, rather than including a one piece runner body 14, includes a plurality of longitudinally spaced apart, discrete, separate runner body segments, generally designated 99. Each runner body segment 99 includes a runner body 414 which is fabricated as a single piece that is stamped or die cut in its entirety from a flat sheet or plate of metal stock, such as aluminum or steel. The stock material is of uniform thickness T (FIG. 24) in the range of ³⁄₁₆" thick. The runner body 414 has a U-shape when longitudinally viewed, (FIGS. 21 and 27) and includes an elongate central base 91 having laterally outer edges 91A integrally coupled to the laterally inner edges 93A of laterally spaced apart upstanding wings, legs or plates 93. The plates 93 have aligned transverse mounting aperture 444 therethrough for pivotally receiving a pivotal coupling pin 478 when the holes 444 are aligned with a cross bore 476 in the keel 413. The holes 444 and the cross bore 476 or each segment 93 are aligned with the holes 444 when the runner body segments 99 are mounted on the underside of the ski 412 as illustrated in FIG. 22.

Figures 28, 29:
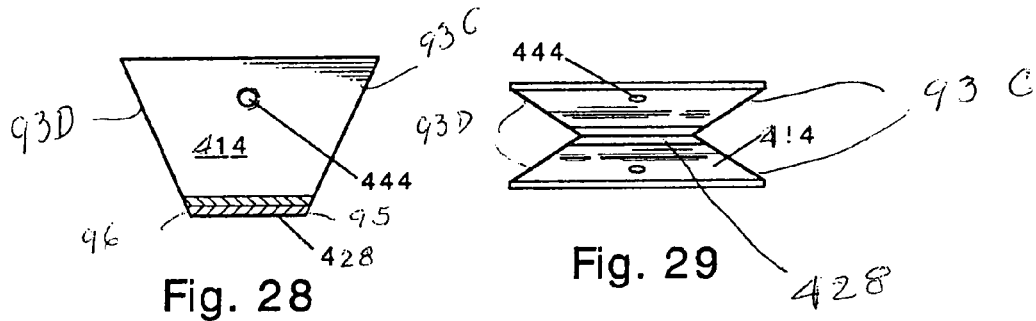
FIG. 28 is a side sectional view, taken along the section line 28-28 of FIG. 27.
FIG. 29 is a bottom view, taken along the line 29-29 of FIG. 27.

The legs 93, as laterally viewed in FIGS. 22 and 28, have a trapezoidal or truncated triangle shape. Each wing or leg 93 includes a laterally inner edge 93A integrally coupled to one of the laterally outer edge portions 91A of the base 91 and a laterally outer edge 95 disposed parallel to the laterally inner edges 93A.

Each upwardly disposed wing, plate or leg 93 includes downwardly converging longitudinally spaced, forward and rearward sides or end edges 93C and 93D, respectively, which provide a clearance or spacing, generally designated by the arrow 94 between the adjacent segments 99. This spacing allows each runner body 414, when the ski 412 and keel 413 vertically flex or undulate along their lengths, to conform to the underlying terrain, and swing, in a to-and-fro path about the axis of one of the pins 478, represented by the directions of the arrows 95 and 96.

A hardened carbide strip 428 is disposed in a slot 430 which is stamped cut or machined in the underside of the base 91. The strip 428 is then brazed or otherwise suitably coupled to the underside of the base 91 of each runner body segment 414.

The lengths L and L1 of the laterally inner and outer parallel edges 91A and 95, respectively, may typically be in the range of 2-2½" and 3-3½", respectively. The slot 430 has a width typically in the range of 3/16 to ½ inch and a depth of approximately ½ of the thickness T of runner body 414.

As illustrated in FIG. 28, the wings and/or walls 93 include longitudinally spaced forward and rear edges 93C and 93D, respectively, which longitudinally diverge outwardly away from the base 91 in a direction toward the outer edge 95. As illustrated in FIG. 28, when the wings 93 are folded upwardly, to the positions illustrated in FIGS. 27 and 28, longitudinally opposite ends 95 and 96 of the carbide wear bar 428, also upwardly diverge and are disposed flush with the longitudinally spaced end edges or surfaces 93C and 93D, respectively.

Figures 23, 24:
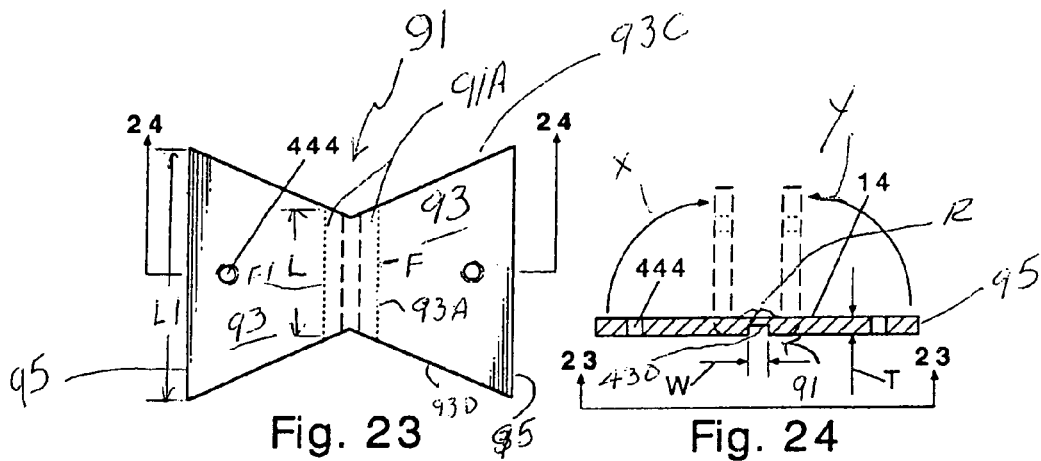
FIG. 23 is a bottom view, taken along the line 23-23 of FIG. 24 illustrating the initial stamping or die cutting of the blank utilized to form the runner body illustrated in FIGS. 21 and 22.
FIG. 24 is a sectional end view, taken along the section line 24-24 of FIG. 23 illustrating the footprint in a planar position.
Figures 25, 26, 27:
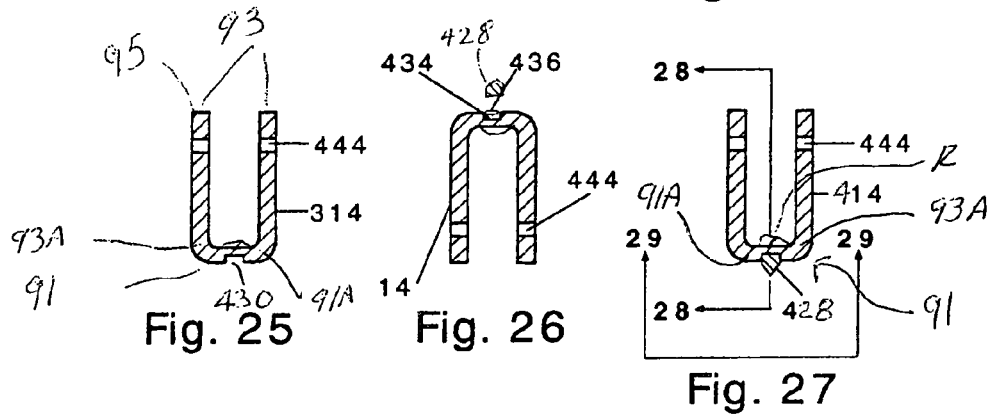
FIG. 25 is an end elevational view illustrating a subsequent step of the manufacture with the wings in the folded position illustrated in phantom lines.
FIG. 26 is an end elevational view illustrating the folded runner body in an inverted position in which time the carbide wear bar is brazed into a socket formed in a base of the runner body.
FIG. 27 is an end elevational view after the brazing of the wear bar has been completed.

FIGS. 23-27 illustrate successive steps in the manufacture of the runner 410 which includes a plurality of longitudinally aligned, longitudinally spaced runner bodies 414. Each runner body 414 is stamped or die cut from a flat sheet of metal in the shape illustrated in FIG. 23 that is sometimes referred to as a "footprint" and may be generally classified as having an "hour glass" or "bow tie" shape. The runner body 414 includes the central base section 91 having laterally opposite edges 91A and 91B integrally coupled at the fold lines F and F1, respectively, to the laterally inner edges 93A of the pair of laterally outwardly extending legs 93. The stamped out footprint illustrated in FIG. 23 includes the wings 93 each in the form or shape of a trapezoid or truncated triangle having a laterally inner edge 93A of a predetermined length L and a laterally outer terminal parallel edge 95 which has a length L1 which is substantially greater than the length of the laterally inner wing edge 93A. As illustrated in FIG. 24, when the hour glass shape is cut, a notch 430 is concurrently stamped into the underside of the central base section 91. During the stamping operation, a mounting hole 444 is concurrently cut into each of the wings 93. The wings 93 are then folded or rolled upwardly and inwardly, in the opposite direction represented by the arrows X and Y to the final positions illustrated in chain lines in FIG. 24 and in solid lines in FIG. 25. The runner 410 is then inverted to the position illustrated in FIG. 26 and a flux agent 434 and brazing material 436 are deposited into the slot 430 and the hardened wear strip 428 is deposited therein. The assembly is placed into an induction heater where brazing occurs as was previously described with regard to FIGS. 2-9 so that the runner body is now in its finished position as illustrated in FIG. 27. The heated and brazed construction may be deposited into a quenching bath to harden the runner body 444.

When the footprint of the runner body 414 is die cut as illustrated in FIG. 23, the holes 444 are concurrently cut and the slot 24 in the carbide wear strip is concurrently punched to form a slight elongate ridge R open the top surface of the base 91. If desired, the ridge R can be removed via machining. Alternatively, the slot 24 may be machined into the undersurface to eliminate the formation of ridge R.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. A snowmobile ski assembly, comprising:
a longitudinally extending ski having an upper surface and a lower surface and at least two longitudinally spaced runner openings;
a runner having a runner body extending longitudinally between opposite ends and having an upper surface and a lower surface;
at least two mounting members extending from said upper surface of said runner body and spaced longitudinally from one another a distance to enable said mounting members to be extended through said runner openings from said lower surface of said ski;
a hard wear strip projecting from said lower surface of said runner and providing an ice-engaging running surface; and
wherein said mounting members comprise flat plate portions, the assembly including a wedge connection interacting between said ski and said mounting members to urge said upper surface of said runner body tightly against said tower surface of said ski.

2. The assembly of claim 1 wherein said mounting members are free of screw threads.

3. The assembly of claim 2 wherein said wedge connection includes a mounting hole formed in each of said mounting members and a fastener with a wedging surface operative to act against said mounting hole when inserted therein.

4. The assembly of claim 3 wherein said ski includes mounting blocks formed with a gap to receive a corresponding one of said mounting members therein, said mounting blocks formed with a cross bore alignable with said mounting hole of said mounting members when said upper surface of said runner body is drawn tight against said lower surface of said ski.

5. The assembly of claim 4 wherein said fastener includes a threaded end section that is relatively smaller in diameter than said size of said mounting hole, an enlarged shank section having a diameter closely approximating the size of said mounting hole, and a frustoconical wedging portion intermediate said threaded end section and said shank section for wedging said mounting hole of said mounting members into alignment with said cross bore of said mounting blocks.

6. The assembly of claim 5 wherein said cross bore includes a threaded section engageable with said threaded section of said fastener.

7. The assembly of claim 1 wherein said wedge connection comprises wedge-shaped notches formed in said mounting members and locking wedges adjacent said upper surface of said ski engagable with said notches for camming said upper surface of said runner body into tight engagement with said lower surface of said ski.

8. The assembly of claim 7 wherein said locking wedges are fixed relative to said ski.

9. The assembly of claim 8 wherein said runner body is displaceable longitudinally relative to said ski to bring said runner body into wedging engagement with said ski.

10. The assembly of claim 1 wherein said runner body and said mounting members are fabricated of a single piece of flat metal plate material.

11. The assembly of claim 10 wherein said wear strip is fabricated of a carbide material.

12. The assembly of claim 11 wherein said carbide wear strip is about the same thickness as that of said metal plate material.

13. The assembly of claim 1 wherein said upper surface of said runner body is formed with at least one notch forming an open space to receive a pry tool.

14. The snowmobile ski assembly set forth in claim 1 wherein said runner body and said mounting members are concurrently stamp cut from a planar sheet of metal to provide said flat plate portions.

* * * * *